(12) United States Patent
Bergman et al.

(10) Patent No.: US 9,969,043 B2
(45) Date of Patent: May 15, 2018

(54) DRILLING APPARATUS AND METHODS OF USING SAME

(71) Applicant: THE BOEING COMPANY, Chicago, IL (US)

(72) Inventors: Michael A. Bergman, Tumwater, WA (US); Jeffrey D. Coleman, Tumwater, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days. days.

(21) Appl. No.: 15/195,592

(22) Filed: Jun. 28, 2016

(65) Prior Publication Data

US 2017/0368655 A1 Dec. 28, 2017

(51) Int. Cl.
*B23Q 11/00* (2006.01)
*B23B 45/00* (2006.01)
*B23B 47/34* (2006.01)

(52) U.S. Cl.
CPC ........ *B23Q 11/0071* (2013.01); *B23B 45/003* (2013.01); *B23Q 11/0046* (2013.01); *B23Q 11/0064* (2013.01); *B23B 47/34* (2013.01); *B23B 2260/10* (2013.01); *B23B 2270/30* (2013.01); *B23B 2270/62* (2013.01)

(58) Field of Classification Search
CPC . Y10T 408/67; Y10T 408/68; Y10T 408/895; Y10T 408/896; B23B 47/34; B23B 2270/30; B23B 2260/058; B23Q 11/0071; B23Q 11/0046; B23Q 11/0064
See application file for complete search history.

(56) References Cited

U.S. PATENT DOCUMENTS

| 2,473,077 A | * | 6/1949 | Starbuck, Jr. | B23B 51/04 408/206 |
| 3,022,806 A | * | 2/1962 | Johnston | B23Q 11/0046 144/252.1 |
| 4,978,255 A | * | 12/1990 | Gale | F16L 41/04 137/15.12 |
| 5,292,210 A | * | 3/1994 | Nowick | B23B 51/0426 408/204 |
| 5,653,561 A | * | 8/1997 | May | B23Q 11/0046 408/67 |
| 5,934,845 A | * | 8/1999 | Frey | B23B 51/0426 408/204 |
| 6,164,881 A | | 12/2000 | Shono | |
| 7,175,371 B2 | | 2/2007 | Vidal | |

(Continued)

OTHER PUBLICATIONS

Webpage Novatek . . . in it for the Long Haul, Universal Drill Shrouds; from http://www.novatekco.conn/products/dustless-surface-prep/universal-drill-shrouds/.

(Continued)

*Primary Examiner* — Daniel Howell
*Assistant Examiner* — Yasir Diab
(74) *Attorney, Agent, or Firm* — Coats & Bennett, PLLC

(57) ABSTRACT

A drilling apparatus comprising: at least one bit; a vacuum shroud, including a compressible boot, disposed around a longitudinal axis of the apparatus and configured to be in operative communication with a vacuum attachment port; and at least one magnetic element disposed near a distal end of the apparatus and configured to attract metallic debris resulting from drilling apparatus operation.

16 Claims, 10 Drawing Sheets

(56) References Cited

U.S. PATENT DOCUMENTS

| | | | |
|---|---|---|---|
| 8,221,037 B2 * | 7/2012 | Neitzell | B23B 51/0426 |
| | | | 408/1 R |
| 9,399,272 B2 | 7/2016 | Magen et al. | |
| 2004/0141820 A1 * | 7/2004 | Mikon | B23Q 11/0046 |
| | | | 408/67 |
| 2007/0264092 A1 * | 11/2007 | Kesten | B23Q 11/0046 |
| | | | 408/67 |

OTHER PUBLICATIONS

Webpage Monroe, Neodymium Discs with holes; from http://catalog.monroeengineering.com/item/neodyrnium-rings-and-cylinders/neodymium-ring-holes/imnd1105.
Webpage Milwaukee 1" Carbide Tipped Hole Saw; from https://www.milwaukeetool.com/accessories/drilling/49-56-1003.

* cited by examiner

DRILLING APPARATUS AND METHODS OF USING SAME

FIELD

The present disclosure, in some aspects thereof, relates to power tools and, more particularly, but not exclusively, to a drilling apparatus.

BACKGROUND

Debris from roof assemblies may enter a fabrication facility and abatement personnel may be stationed in protective equipment on lifts under each penetration to assist with debris collection and/or removal. Working at heights and in close proximity to cranes and/or existing building structural components may pose additional issues. Coordinating elevated work at hundreds of locations above the fabrication floor may impact production, including delays and enhanced costs.

BRIEF SUMMARY

There is provided a drilling apparatus comprising: at least one bit; a vacuum shroud disposed around a longitudinal axis of the apparatus and configured to be in operative communication with a vacuum attachment port; and at least one magnetic element disposed near a distal end of the apparatus and configured to attract metallic debris resulting from drilling apparatus operation.

In an aspect, the drilling apparatus further comprises a motorized element configured to impart motion to the at least one bit.

In an aspect, the drilling apparatus further comprises a vacuum apparatus operatively connected to the vacuum shroud via the vacuum attachment port and configured to vacuum up at least non-metallic debris.

In an aspect, the drilling apparatus further comprises a compressible boot reversibly attached to the vacuum shroud.

In an aspect, the compressible boot is configured to be reversibly compressible by extending and contracting along a longitudinal axis of the drilling apparatus.

In an aspect, the compressible boot comprises a plurality of reversibly compressible pleats.

In an aspect, the compressible boot comprises a plurality of telescoping sections.

In an aspect, the compressible boot is airtight except at an open distal end.

In an aspect, the drilling apparatus further comprises a vacuum attached to the vacuum attachment port.

In an aspect, the drilling apparatus further comprises a debris receptacle in operative communication with the vacuum shroud.

In an aspect, the at least one bit comprises a cylindrical body defining an inner cavity and the magnetic element is disposed within the inner cavity of the bit.

In an aspect, the at least one bit includes at least one gap therethrough.

In an aspect, the vacuum shroud is removably attached to the motorized element.

In an aspect, the bit is at least one of a hole saw bit and pilot bit.

In an aspect, the at least one hole saw bit and pilot bit are included in a kit of a plurality of bits configured for use with the drilling apparatus.

There is further provided, a method of using a drilling apparatus, the method comprising: activating a drill motor; penetrating a surface with a bit; attracting magnetic debris from the penetrating to a magnetic element disposed near a distal end of the bit; and, vacuuming away from the surface at least one of magnetic debris and non-magnetic debris resulting from the penetrating.

In an aspect, the method further comprises trapping at least one of the magnetic and non-magnetic debris within a vacuum shroud disposed around a longitudinal axis of the bit.

In an aspect, the method further comprises depositing the at least one of the magnetic and non-magnetic debris into a debris receptacle by vacuum suction from the vacuuming.

In an aspect, the method further comprises removing the magnetic debris from the magnetic element.

There is further provided a drilling apparatus kit comprising: a plurality of drill bits of different configurations, each drill bit configured to magnetically attract metallic debris; and a vacuum shroud configured to be coupled about each drill bit of the plurality of drill bits, the vacuum shroud configured to be in operative communication with a vacuum attachment port.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of aspects of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWING(S)

Some aspects of the disclosure are herein described, by way of example only, with reference to the accompanying drawings. With specific reference now to the drawings in detail, it is stressed that the particulars shown are by way of example, are not necessarily to scale, and are for purposes of illustrative discussion of aspects of the disclosure. In this regard, the description taken with the drawings makes apparent to those skilled in the art how aspects of the disclosure may be practiced.

DETAILED DESCRIPTION

Figure 1:
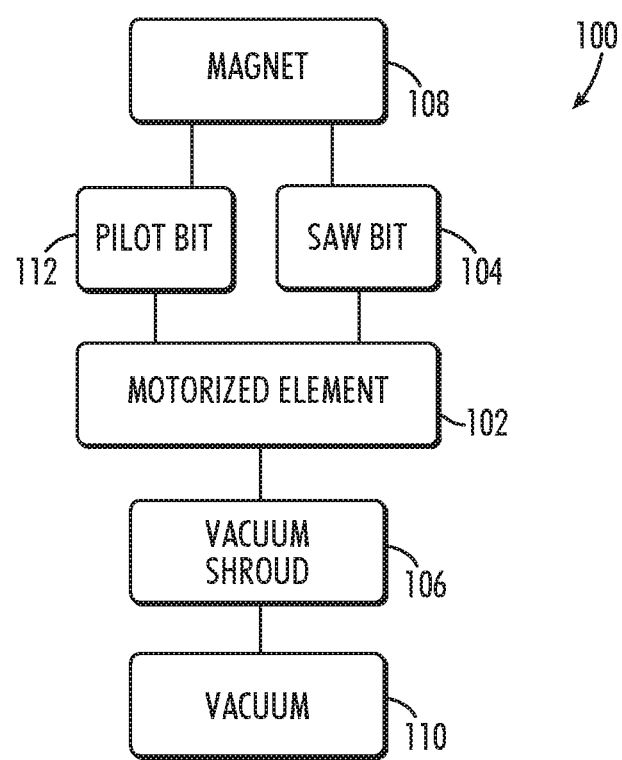
FIG. 1 is a block diagram of an exemplary drilling apparatus.

The present disclosure, in some aspects thereof, relates to power tools and, more particularly, but not exclusively, to a drilling apparatus.

Before explaining at least one aspect of the disclosure in detail, it is to be understood that the disclosure is not necessarily limited in its application to the details of construction and the arrangement of the components and/or methods set forth in the following description and/or illustrated in the drawings. The disclosure is capable of other aspects or of being practiced or carried out in various ways.

Generally, a drilling apparatus is provided which is configured, in some aspects, as a hole saw, that is, with a saw bit adapted for cutting holes into surfaces. In nominal operation of the drilling apparatus, debris is created which is removed from the cutting surface and/or prevented from falling through the hole being created by a vacuum and a magnetic element working in combination, in some aspects of the disclosure. The magnetic element is used for attracting metallic debris and the vacuum is used for applying suction to remove non-metallic and/or metallic debris from the work surface (where a hole is being cut). As used herein, a "proximal" end or portion of the drilling apparatus is that which is closest to the hand of the user, whereas a "distal" end or portion of the drilling apparatus is that which is closest to the work surface, opposite the proximal end of the drilling apparatus. It should be understood that while some aspects of the disclosure describe the drilling apparatus configured as a hole saw, virtually any debris creating power tool could be the "drilling apparatus" incorporating vacuum and magnetic forces for debris removal.

Referring now to the drawings, FIG. 1 is a block diagram of an exemplary drilling apparatus 100 including at least one bit 104, 112 a vacuum shroud 106 and at least one magnetic element 108. In some aspects, the drilling apparatus 100 is a hand held power tool, for example a drill, provided with a motorized element 102. The drill is adapted to a hole-cutting saw configuration by attaching a saw bit 104, for example a ¾" Milwaukee 1" Hole Saw, onto a distal end 204 (shown and described in more detail with respect to FIG. 2A) of the drill and about a longitudinal axis 202 (shown and described in more detail with respect to FIG. 2A), in some aspects of the disclosure. Additionally and/or optionally, a pilot bit 112 is also attached to the distal end 204 of the drill to assist with hole cutting accuracy and/or stabilization of the drilling apparatus 100 during cutting.

A vacuum shroud 106 optionally includes a compressible boot 208 that is placed around at least a portion of the saw bit 104 and/or pilot bit 112 and about the longitudinal axis 202. In some aspects, a vacuum shroud 106 such as the Novatek™ Universal Drill Shroud Model #DD-3 is used. In some aspects of the disclosure, a vacuum with at least a 2 horsepower (HP) motor is used, although depending on the operational use of the drilling apparatus 100, a lesser powered vacuum 110 could be conceivably used. In some aspects, a vacuum attachment port 206 (shown and described in more detail with respect to FIG. 2A) connects the vacuum shroud 106 to the vacuum 110.

At least one magnetic element 108 is provided to the drilling apparatus 100 at or near the distal end 204 of the apparatus 100 to attract metallic debris near the distal end 204. The at least one magnetic element 108 is configured to provide at least 50 pounds (lbs.) of pull; although a lesser powered magnetic element(s) 108 could be used depending on the likely metallic debris to be encountered. In some aspects, the at least one magnetic element 108 is shaped like a disk or ring, such as the Monroe Engineering part #IMND1105, and is placed around the pilot bit 112 and/or around an inner circumference of the saw bit 104 around the longitudinal axis 202. In an aspect, the at least one magnetic element 108 is weight balanced around the longitudinal axis 202 of the apparatus 100.

The vacuum shroud 106 is operatively connected to a vacuum 110, where the vacuum provides suction to the vacuum shroud 106 for evacuating metallic and/or non-metallic debris from within the vacuum shroud 106. The compressible boot 208 is substantially airtight, when attached to the vacuum shroud 106, excepting for an open distal end of the compressible boot 208. The open distal end of the compressible boot 208 becomes substantially closed when, during operation of the drilling apparatus, the distal end of the compressible boot 208 is pushed down onto the work surface 502 (as shown and described in more detail with respect to FIGS. 5A-5D) as the saw bit 104 and/or the pilot bit 112 drill/cut into the work surface. The closing of the open distal end of the compressible boot 208 and the substantially airtight nature of the compressible boot 208 itself provide a favorable environment for removing debris within the compressible boot 208 and/or the vacuum shroud 106 by applying suction without substantial air-loss and/or for trapping non-metallic and/or metallic debris.

The compressible boot 208 is configured to be at least partly compressible (contracting along the longitudinal axis 202 of the apparatus 100) because, as shown in FIGS. 5A-5D, during operation of the drilling apparatus 100 the distance between the work surface (on which the distal end of the boot 208 will rest) and the motorized element 102 will shrink as the pilot bit 112 and/or the saw bit 104 drill/cut through the work surface. The compressible boot 208 is adapted for reversible compression (extendable along the longitudinal axis 202 of the apparatus 100 after contraction) by being pleated, similar to an accordion, in some aspects. It should be understood that pleating is merely one example of how to make the boot 208 compressible, it could also be, for example, a telescoping (with a plurality of concentric and overlapping panels), compressible boot.

The vacuum shroud 106 and/or the compressible boot 208 are configured for reversible attachment at least to assist with cleaning the drilling apparatus 100 and/or for changing/replacing drill bits and/or saw bits. In some aspects, the vacuum shroud 106 is reversibly attached to the motorized element 102 using tightening screws 210, which screw down onto the motorized element 102. In some aspects, the compressible boot 208 is reversibly attached to the vacuum shroud 106 using a snap-lock coupler.

Figure 2A:
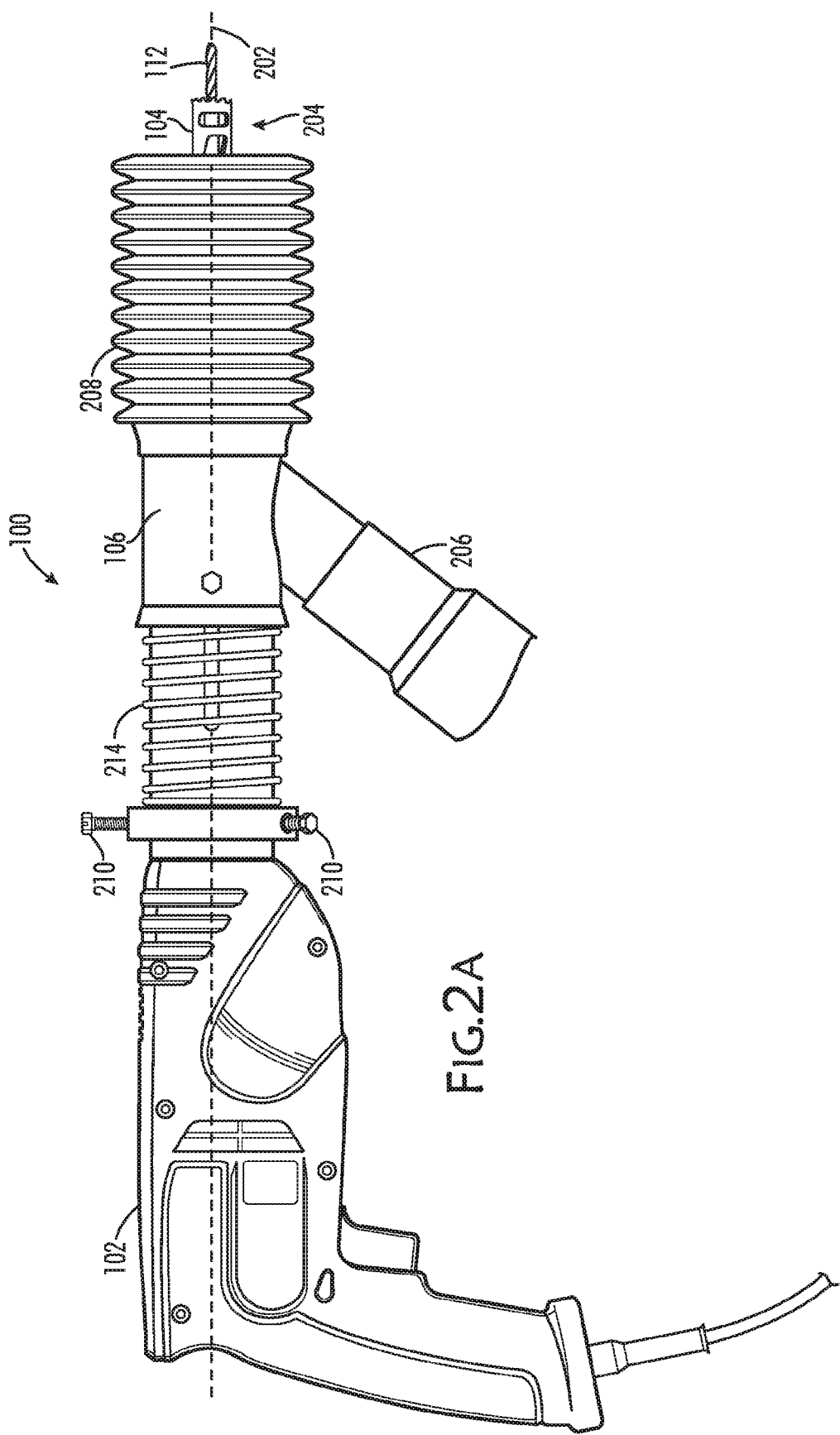
FIG. 2A is a side view of the drilling apparatus represented in FIG. 1.

FIG. 2A is a side view of drilling apparatus 100. In an aspect of the disclosure, a motorized element 102, for example a drill, is attached to a vacuum shroud 106, to which is attached at least one bit 104, 112. As described elsewhere herein, at least one tightening screw 210 is optionally used to removably attach the vacuum shroud 106 to the motorized element 102. The compressible boot 208 is optionally disposed around at least a part of the at least one bit 104, 112 and is attached to the distal end of the vacuum shroud 106 at a proximal end of the compressible boot 208. As described elsewhere herein, a snap-lock coupler is optionally used to removably attach the vacuum shroud 106 to the motorized element 102. The vacuum shroud 106 is configured with a vacuum attachment port 206 to which a vacuum apparatus 110 can be attached.

In an aspect, at least a portion of the vacuum shroud 106 is configured to be reversibly compressible, for example by being provided with a spring 214 or coil around the outside and/or inside and/or within a flexible, airtight material. Optionally, the resilience of the spring 214 is configured or configurable to provide desirable resistance during compression of the vacuum shroud 106 during use of the drilling apparatus 100.

In an aspect, the spring 214 (or coil) is used to adjust drilling depth of the drilling apparatus 100, for example by increasing resistance as depth increases and/or by the coils of the spring stacking at a maximum level of compression, preventing additional advancement of the drilling apparatus 100.

Figure 2B:
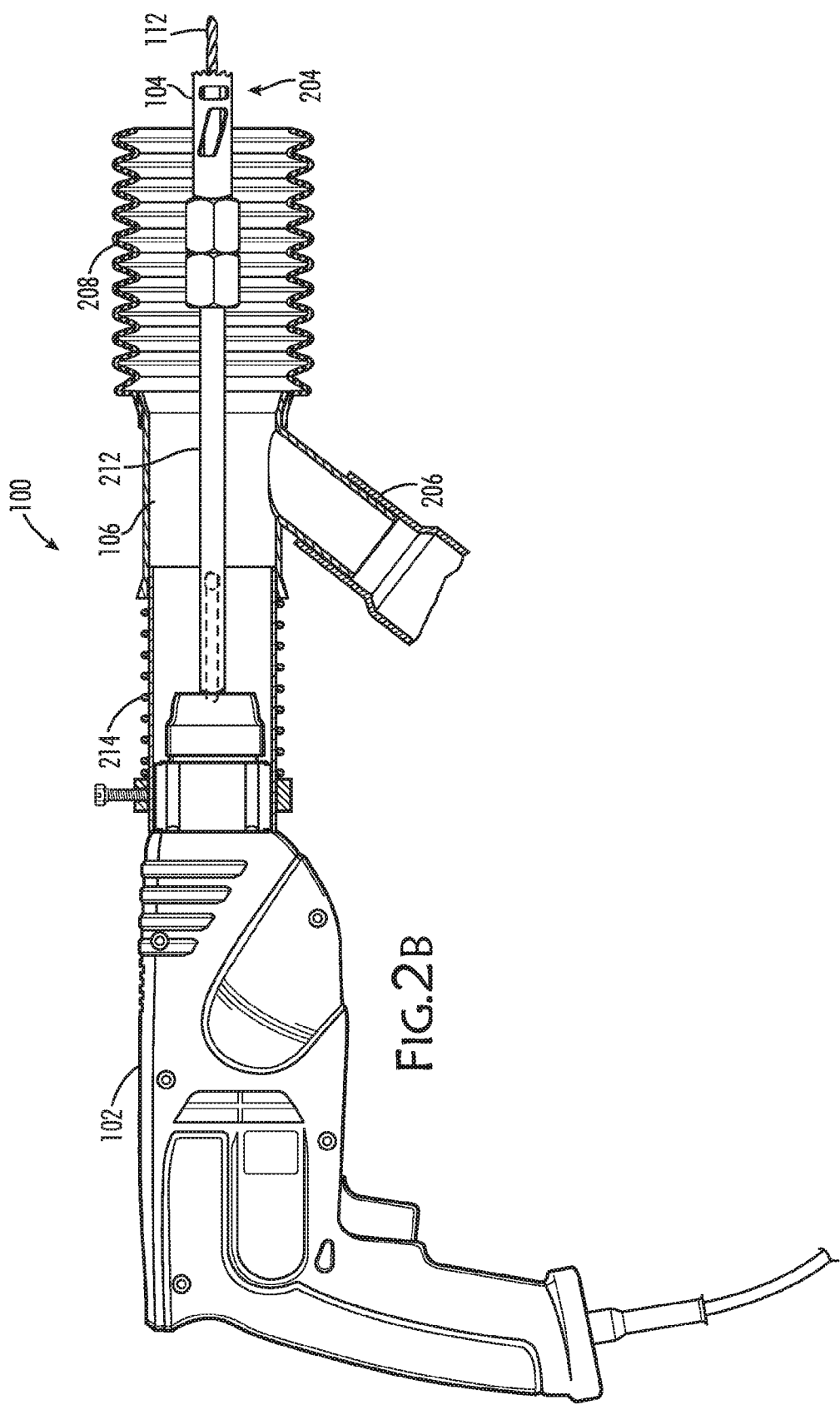
FIG. 2B is a partial, cross-sectional view of the drilling apparatus of FIG. 2A.

FIG. 2B is a partial, cross-sectional view of the drilling apparatus 100 of FIG. 2A. In some aspects of the disclosure, the bits attached to the distal end 204 of the drilling apparatus 100 are attached to a drill bit extension 212 to account for the length of the vacuum shroud 106 and/or the compressible boot 208.

Figure 3:
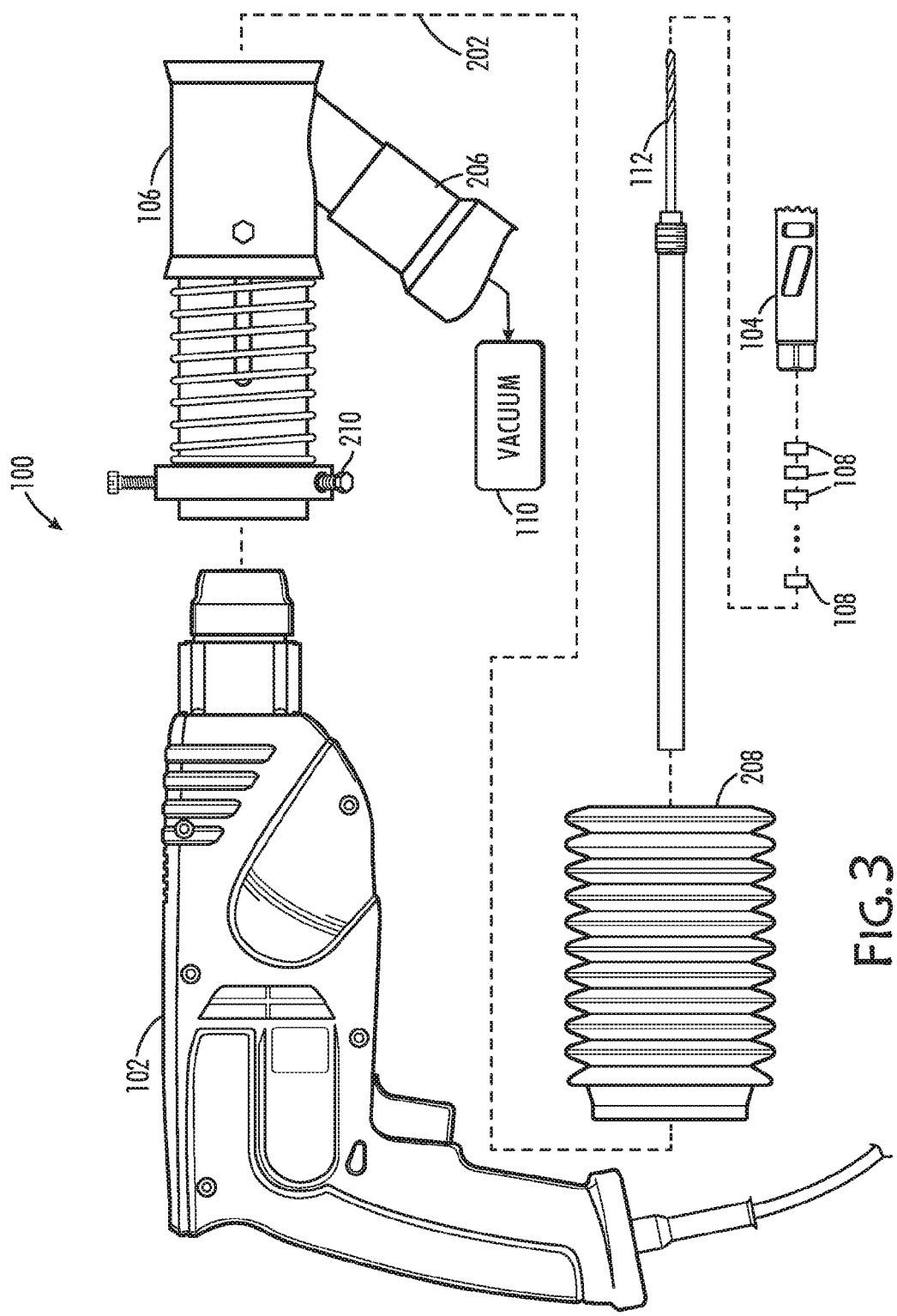
FIG. 3 is a partial, exploded view of the drilling apparatus of FIG. 2A.

FIG. 3 is a partial, exploded view of the drilling apparatus 100 of FIG. 2A, in which the longitudinal axis 202 of the drilling apparatus 100 corresponds with the dashed line of FIG. 3 showing the interrelationship of the components.

Figure 4:
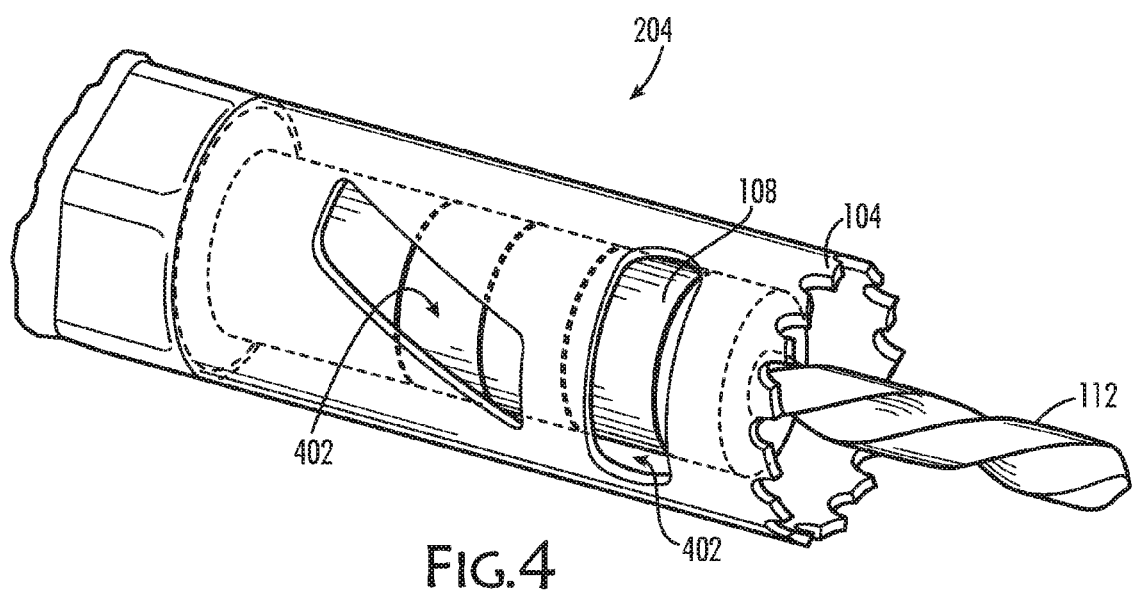
FIG. 4 is a perspective view of the distal end of the drilling apparatus of FIG. 2A.

FIG. 4 is a perspective view of the distal end 204 of the drilling apparatus 100, including the saw bit 104, the pilot bit 112 and at least one magnet 108. In an aspect of the disclosure, the at least one magnet 108 is disposed around the pilot bit 112 and around the longitudinal axis 202 of the drilling apparatus 100. Also shown are gaps 402 provided to the saw bit 104 to allow for debris to be evacuated from the interior of the saw bit 104. For example, when vacuum suction is applied, non-metallic and/or metallic debris created by drilling/cutting which manifests within the saw bit 104 is sucked out of and away from the saw bit 104.

Figure 5A:
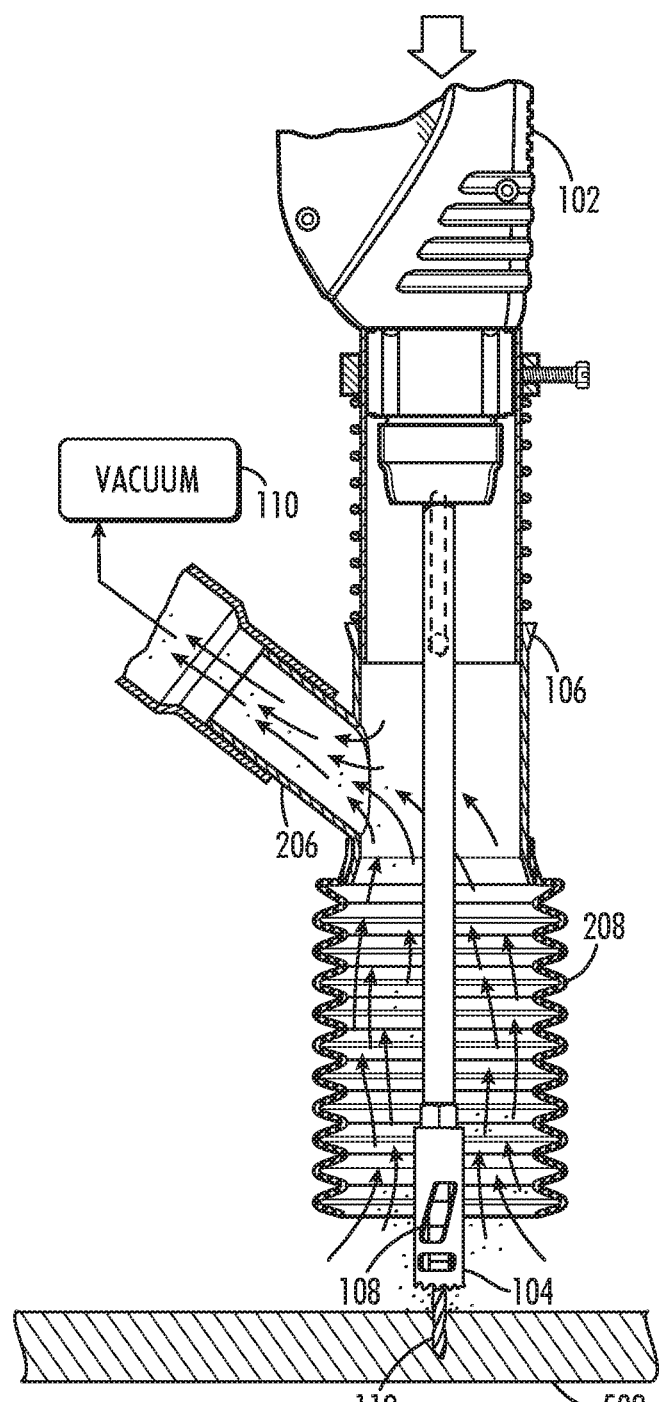
FIGS. 5A-5D are progressive side views of the drilling apparatus of FIG. 2A being used; and, FIG. 6 is a flowchart of an exemplary method of using a drilling apparatus, such as the drilling apparatus shown in FIGS. 1-5D.

FIGS. 5A-5D are progressive side views of the drilling apparatus 100 being used. For efficiency, the method of using the drilling apparatus 100, as shown in the flowchart 600 of FIG. 6, will be described in conjunction with FIGS. 5A-5D. FIG. 5A shows an initial phase of operation where the motorized element 102 has been activated (602) causing the pilot bit 112 to rotate. Rotation of the pilot bit 112 is used to penetrate (604) the working surface 502, where the relatively small diameter of the pilot bit 112 facilitates location accuracy and/or enhances stability of operation when the saw bit 104 contacts the working surface 502 (since the pilot bit 112 is already embedded in the working surface by that point, fixing the distal end 204 of the drilling apparatus 100).

Metallic debris created by the penetration (604) of the pilot bit 112 and/or the saw bit 104 is attracted (606) to the at least one magnetic element 108, drawing the metallic debris away from the working surface 502. Additionally, non-metallic debris created by the penetration (604) of the pilot bit 112 and/or the saw bit 104 is vacuumed (608) away by the vacuum 110, drawing the non-metallic debris away from the working surface 502 and, optionally, into a debris receptacle.

Figure 5B:
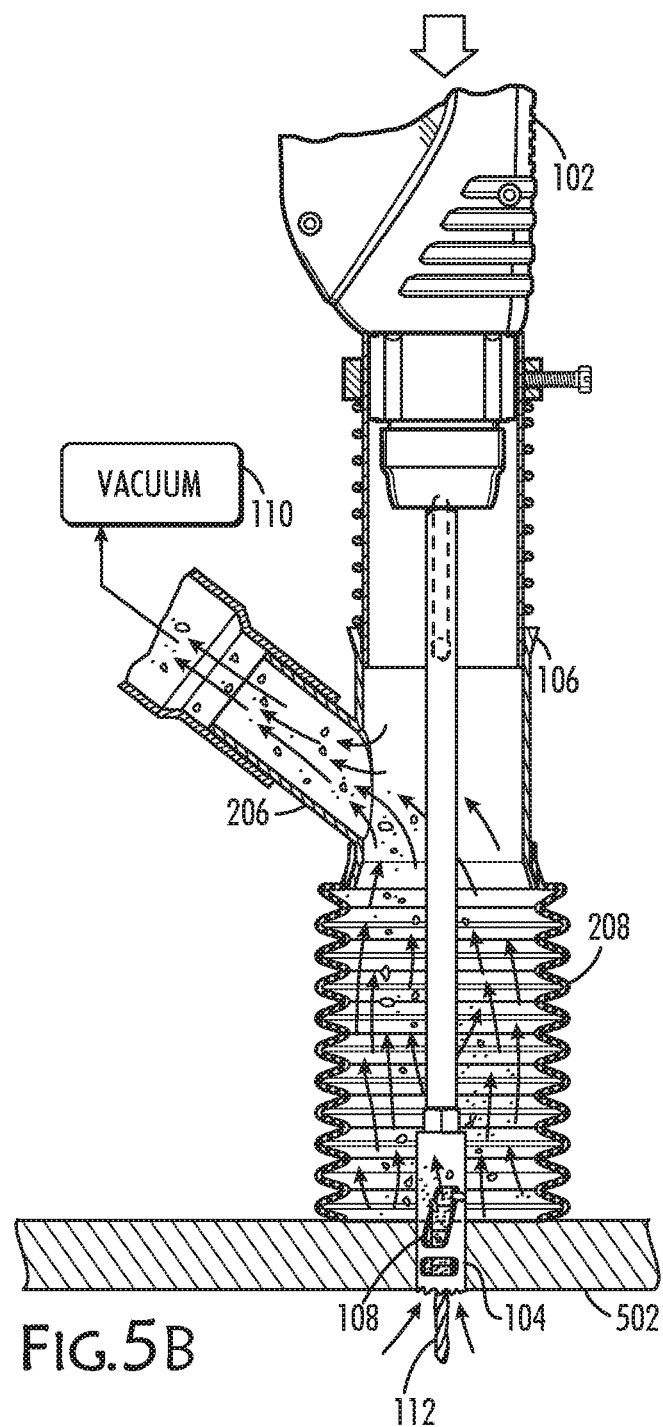
Figure 6:
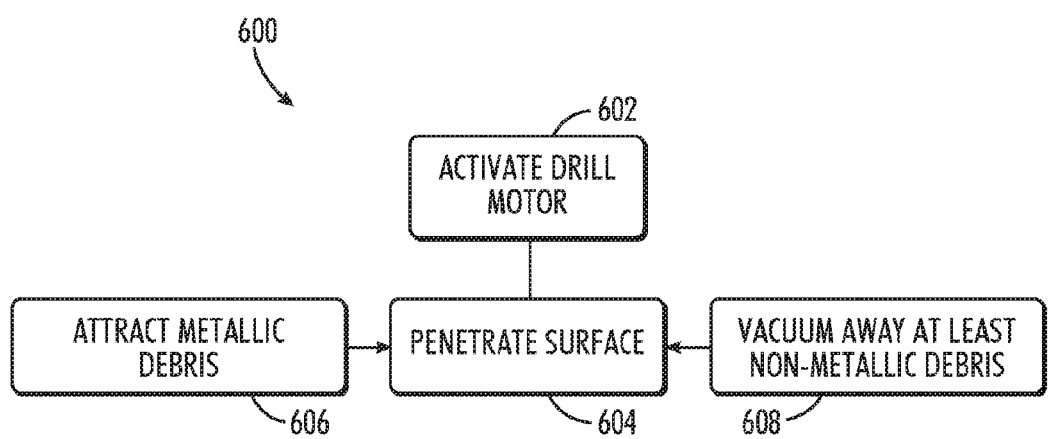

FIG. 5B shows, as the drilling apparatus 100 is urged into the working surface 502, the compressible boot 208 contacting the working surface 502 and subsequently "closing" the open distal end of the compressible boot 208, practically sealing the interior of the compressible boot 208 and facilitating trapping the debris and/or debris removal.

Figure 5C:
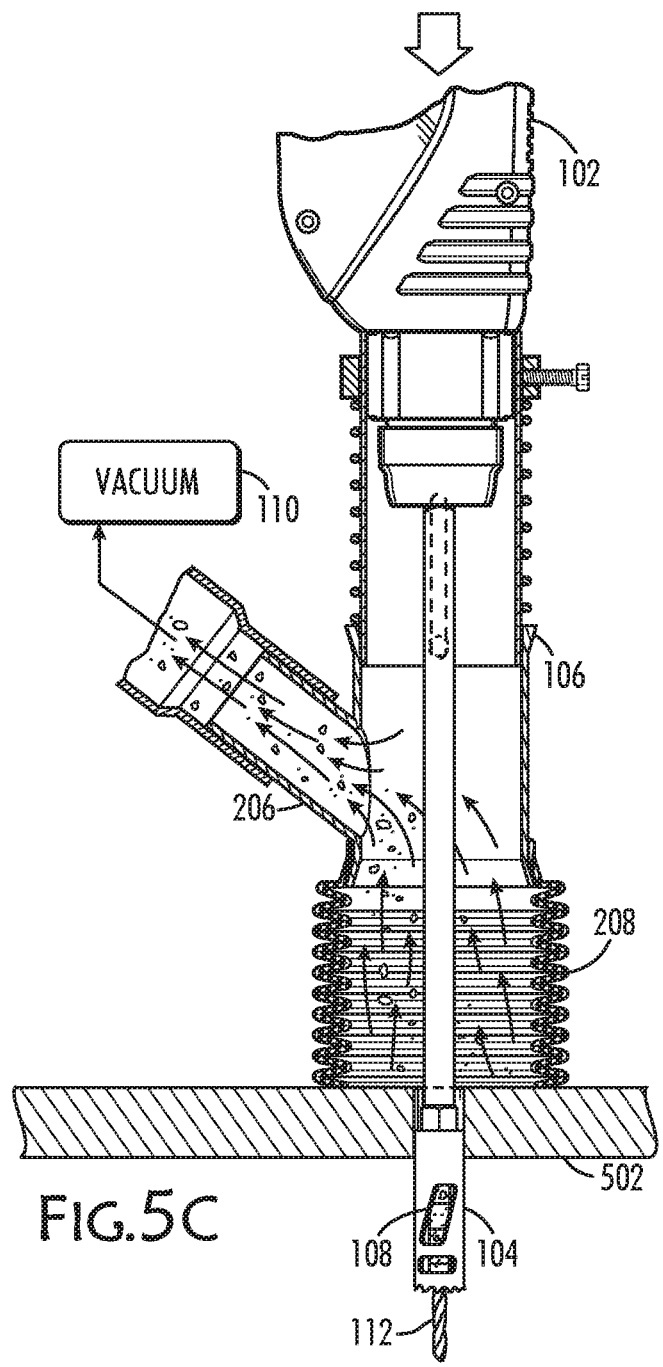

FIG. 5C shows sustained urging of the drilling apparatus 100 into the working surface, and subsequent compression of the compressible boot 208 as the distance between the motorized element 102 and the working surface 502 is shortened.

Figure 5D:
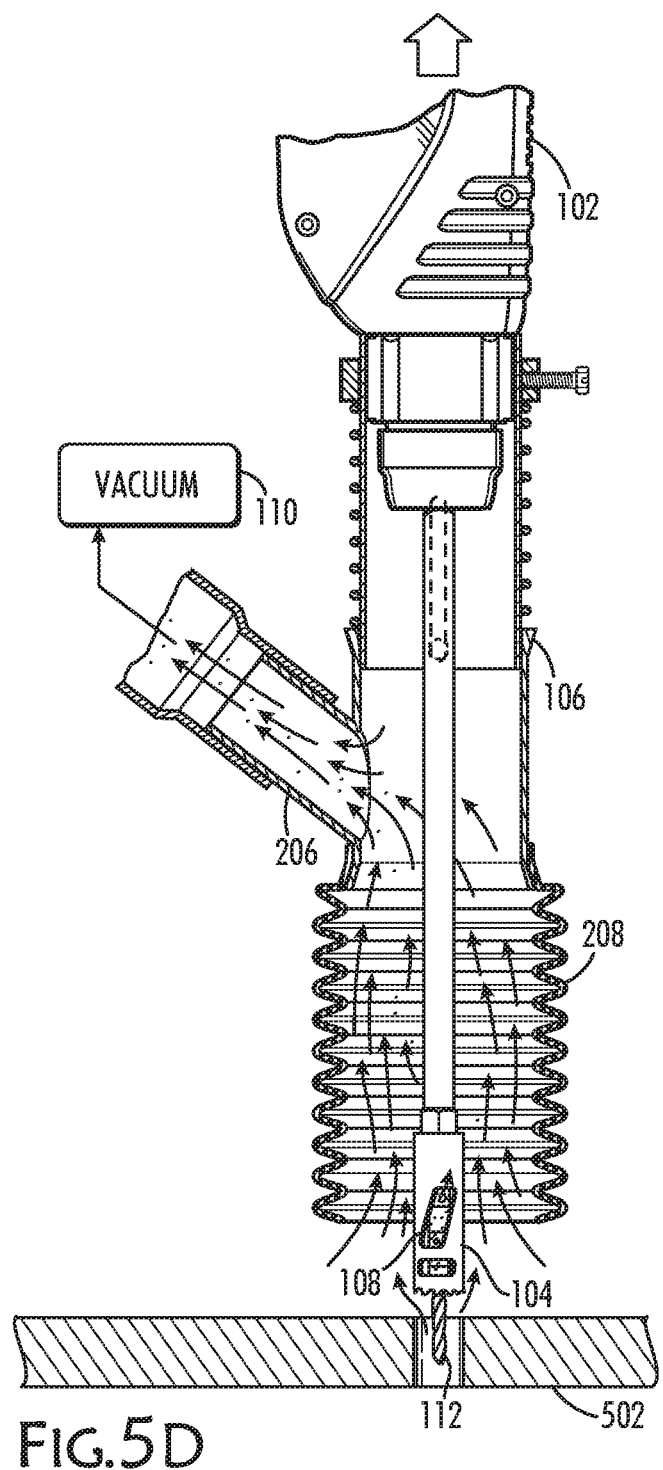

FIG. 5D shows the drilling apparatus 100 being withdrawn after a hole has been cut into the working surface 502, in an aspect of the disclosure. Optionally, vacuum suction and magnetic attraction continuously remove at least one of metallic and non-metallic debris while the drilling apparatus 100 is removed from the working surface.

In some aspects of the disclosure, metallic debris is removed from the at least one magnetic element 108 during and/or after the hole has been cut. Optionally, the debris is removed using a magnet stronger than the at least one magnetic element 108 and/or mechanically, for example by a brush. Optionally, at least one bit is removed from the drilling apparatus 100 for cleaning.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof Throughout this application, various aspects of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. Further, described ranges are intended to include numbers outside any range described within statistical error and/or inherent measurement equipment limitations.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate aspects, may also be provided in combination in a single aspect. Conversely, various features of the disclosure, which are, for brevity, described in the context of a single aspect or drawing, may also be provided separately or in any suitable subcombination or as suitable in any other described aspect of the disclosure. Certain features described in the context of various aspects are not to be considered essential features of those aspects, unless the aspect is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A drilling apparatus comprising:
   at least one bit;
   a vacuum shroud disposed around a longitudinal axis of the apparatus and configured to be in operative communication with a vacuum attachment port; and
   a first magnet disposed near a distal end of the apparatus and configured to attract metallic debris resulting from drilling apparatus operation; wherein the first magnet is disposed such that the first magnet surrounds the longitudinal axis and weight balances itself around the longitudinal axis;
   a second magnet disposed to surround the longitudinal axis;
   wherein the first and second magnets are disposed in a longitudinal series such that the first magnet is disposed more distally than the second magnet;
   wherein the bit is at least one of a hole saw bit and a pilot bit; wherein the first and second magnets are ring magnets disposed about the pilot bit or hole saw bit for rotation with the pilot bit or the hole saw bit.

2. A drilling apparatus according to claim 1, further comprising a motorized element configured to impart motion to the at least one bit.

3. A drilling apparatus according to claim 1, further comprising a vacuum apparatus operatively connected to the vacuum shroud via the vacuum attachment port and configured to vacuum up at least non-metallic debris.

4. A drilling apparatus according to claim 1, further comprising a compressible boot attached to the vacuum shroud.

5. A drilling apparatus according to claim 4, wherein the compressible boot is configured to be reversibly compressible by extending and contracting along a longitudinal axis of the drilling apparatus.

6. A drilling apparatus according to claim 4, where the compressible boot comprises a plurality of reversibly compressible pleats.

7. A drilling apparatus according to claim 4, wherein the compressible boot is airtight except at an open distal end.

8. A drilling apparatus according to claim 1, further comprising a vacuum attached to the vacuum attachment port.

9. A drilling apparatus according to claim 1, wherein the at least one bit is a hole saw bit comprising a cylindrical body defining an inner cavity; wherein the first and second magnets are disposed within the inner cavity.

10. A drilling apparatus according to claim 1, wherein the at least one bit includes at least one gap therethrough.

11. A drilling apparatus according to claim 2, wherein the vacuum shroud is removably attached to the motorized element.

12. A drilling apparatus according to claim 1, wherein the bit is included in a kit of a plurality of bits configured for use with the drilling apparatus.

13. A method of using a drilling apparatus, the method comprising:
   activating a drill motor;
   penetrating a surface with a bit rotating about a longitudinal axis;
   attracting magnetic debris from the penetrating to a first magnet disposed near a distal end of the bit; wherein the first magnet is disposed such that the first magnet surrounds the longitudinal axis and weight balances itself around the longitudinal axis;
   wherein the attracting magnetic debris comprises attracting magnetic debris to the first magnet and a second magnet, wherein the second magnet is disposed to surround the longitudinal axis, wherein the first and second magnets are disposed in a longitudinal series such that the first magnet is disposed more distally than the second magnet; wherein the bit is at least one of a hole saw bit and a pilot bit; wherein the first and second magnets are ring magnets disposed about the pilot bit or hole saw bit for rotation with the pilot bit or the hole saw bit; and
   vacuuming away from the surface at least one of magnetic debris and non-magnetic debris resulting from the penetrating.

14. A method according to claim 13, further comprising trapping at least one of the magnetic and non-magnetic debris within a vacuum shroud disposed around a longitudinal axis of the bit.

15. A method according to claim 14, further comprising removing the magnetic debris from the first magnet.

16. A drilling apparatus kit comprising:
   a plurality of drill bits of different configurations, each drill bit configured to magnetically attract metallic debris; wherein each drill bit is at least one of a hole saw bit and a pilot bit and comprises:
      a respective first magnet, wherein each first magnet is disposed such that it surrounds the corresponding bit's longitudinal axis and weight balances itself around that corresponding longitudinal axis; and
      a respective second magnet disposed to surround the corresponding bit's longitudinal axis; and wherein the first and second magnets are ring magnets disposed about the corresponding pilot bit or hole saw bit for rotation with the corresponding pilot bit or the hole saw bit;
      wherein, for each drill bit, the first and second magnets of that drill bit are disposed in a longitudinal series such that the first magnet is disposed more distally than the second magnet; and
   a vacuum shroud configured to be coupled about each drill bit of the plurality of drill bits, the vacuum shroud configured to be in operative communication with a vacuum attachment port.

* * * * *